(12) United States Patent
Osaki

(10) Patent No.: US 7,188,230 B2
(45) Date of Patent: Mar. 6, 2007

(54) METHOD OF ASSURING DATA INTEGRITY ON STORAGE VOLUMES

(75) Inventor: Nobuyuki Osaki, Campbell, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/058,808

(22) Filed: Feb. 15, 2005

(65) Prior Publication Data

US 2006/0184764 A1 Aug. 17, 2006

(51) Int. Cl.
- G06F 12/14 (2006.01)
- G06F 12/16 (2006.01)
- G06F 11/10 (2006.01)

(52) U.S. Cl. .................. 711/216; 711/152
(58) Field of Classification Search ............... None
See application file for complete search history.

(56) References Cited

U.S. PATENT DOCUMENTS

| 5,255,270 | A | 10/1993 | Yanai et al. |
| 6,467,060 | B1 | 10/2002 | Malakapalli et al. |
| 6,658,592 | B1 | 12/2003 | Cohen et al. |
| 6,922,782 | B1 | 7/2005 | Spyker et al. |
| 6,988,180 | B2* | 1/2006 | Kadatch .................. 711/216 |
| 2001/0027450 | A1* | 10/2001 | Shinoda et al. ............. 707/1 |
| 2003/0126400 | A1 | 7/2003 | Debiez et al. |

FOREIGN PATENT DOCUMENTS

WO  WO99/38093 A1  7/1999

OTHER PUBLICATIONS

"Hitachi Data Retention Utility," product datasheet Hitachi Data Systems Corporation Santa Clara, CA (Jun. 2005).

* cited by examiner

Primary Examiner—B. James Peikari
(74) Attorney, Agent, or Firm—Townsend and Townsend and Crew LLP

(57) ABSTRACT

A method for assuring the integrity of stored data in a storage system is provided. At a specified time at which further writes to a desired portion of the stored data are to be precluded, a hash value is calculated for the desired portion of stored data. At a later time, retrieval of the stored data is performed and the hash value recalculated. A comparison of the former and present hash values reveals whether the data has remained unchanged.

10 Claims, 6 Drawing Sheets

| Section ID | Vol ID | Data Range | Hash Value |
|---|---|---|---|
| 1 | 1 | 0-1023 | E0 55 89 73 21 CB A6 32 ...... |
| 2 | 1 | 1024-2047 | F5 00 81 D6 A4 98 AB 5E ...... |
| 3 | 1 | 2048-4095 | 2F E1 F3 0F 64 57 64 57 ...... |
| 4 | 1 | 4096-8191 | 71 EA F6 86 3C 38 F1 A4 ...... |
| 5 | 2 | 0-1023 | 2F FE 22 9D E4 FF 00 3F ...... |
| 6 | 2 | 1024-2047 | BF EF 9D C0 FF 00 41 59 ...... |
| 7 | 2 | 2048-4095 | 7E 82 BD F3 DC 5F FC 45 ...... |

Fig. 2

| Section ID | Vol ID | Data Range | Hash Value | Key |
|---|---|---|---|---|
| 1 | 1 | 0-1023 | E0 55 89 73 21 CB A6 32 ..... | |
| 2 | 1 | 1024-2047 | F5 00 81 D6 A4 98 AB 5E ..... | |
| 3 | 1 | 2048-4095 | 2F E1 F3 0F 64 57 64 57 ..... | |
| 4 | 1 | 4096-8191 | 71 EA F6 86 3C 38 F1 A4 ..... | |
| 5 | 2 | 0-1023 | 2F FE 22 9D E4 FF 00 3F ..... | |
| 6 | 2 | 1024-2047 | BF EF 9D C0 FF 00 41 59 ..... | |
| 7 | 2 | 2048-4095 | 7E 82 BD F3 DC 5F FC 45 ..... | |

Fig. 6

METHOD OF ASSURING DATA INTEGRITY ON STORAGE VOLUMES

BACKGROUND OF THE INVENTION

This invention relates to storage systems, and in particular to techniques of assuring data integrity in such systems.

Large organizations throughout the world now are involved in millions of electronic transactions which include enormous amounts of text, video, graphical and audio information. This information is being categorized, stored, accessed, and transferred every day. The volume of such information continues to increase. One technique for managing such massive amounts of information is to use storage systems. Conventional storage systems include large numbers of disk drives operating under various control mechanisms which record, mirror, remotely backup, and reproduce this data. This rapidly growing amount of data requires most companies to manage the data carefully with their information technology systems.

An increasingly important aspect in the management of such data is the need to preserve it and to later establish that the data has not been altered. For example, a common goal in the management of data is now to preserve the data on a certain volume at a certain point in time for a certain period of time. For example, in the United States, Securities and Exchange Commission Rule 17a-4 requires certain institutions to preserve communication information, such as e-mail, voice mail, and various documents, for a specified amount of time. To date such preservation of data has often taken the form of copying the data to various media, and associating with that media certain precautions to assure that the media is not changed between the time when the data was originally stored and some later time. In one such example, data is backed up using tape drives and the tapes securely maintained to assure that they have not been altered since being originally written. Unfortunately, such mechanisms are cumbersome, inefficient, and difficult to implement. The various measures often substantially increase the cost of preserving the data.

Accordingly, it would be desirable to have a more efficient and effective mechanism for assuring the integrity of stored data, but without the inconvenience of prior systems, such as backup systems.

BRIEF SUMMARY OF THE INVENTION

This invention addresses the need of assuring data integrity, and does so by preserving data on hard disk drives in a manner which assures that it the data on a desired volume has not been altered since a specified time, the time being selected by the user of the system. Preferably the system is implemented by providing a storage system with functionality to decline write requests, and accept only read requests, to the desired volume or portion thereof. In addition, techniques are employed to prove that the stored data has not been altered since the specified time, for example, by surreptitious re-writing of the data by overcoming the read-only restriction.

In a preferred embodiment, the storage system providing this functionality includes a first storage volume for storing selected data and a second storage volume coupled to the first storage volume. A controller is coupled to the second storage volume for calculating at the selected time a first hash value of the data and storing that first hash value in the second storage volume. At some later time, when it is desired to determine the integrity of the data, the first stored hash value can be compared to a new hash value calculated for the data, thereby enabling a determination to be made about whether the data has been changed between the selected time and the later time when verification is performed.

BRIEF DESCRIPTION OF THE DRAWINGS

FIG. 2 illustrates a hash value table;

FIG. 6 is a diagram illustrating storage of encryption keys for one embodiment.

DETAILED DESCRIPTION OF THE INVENTION

Figure 1:
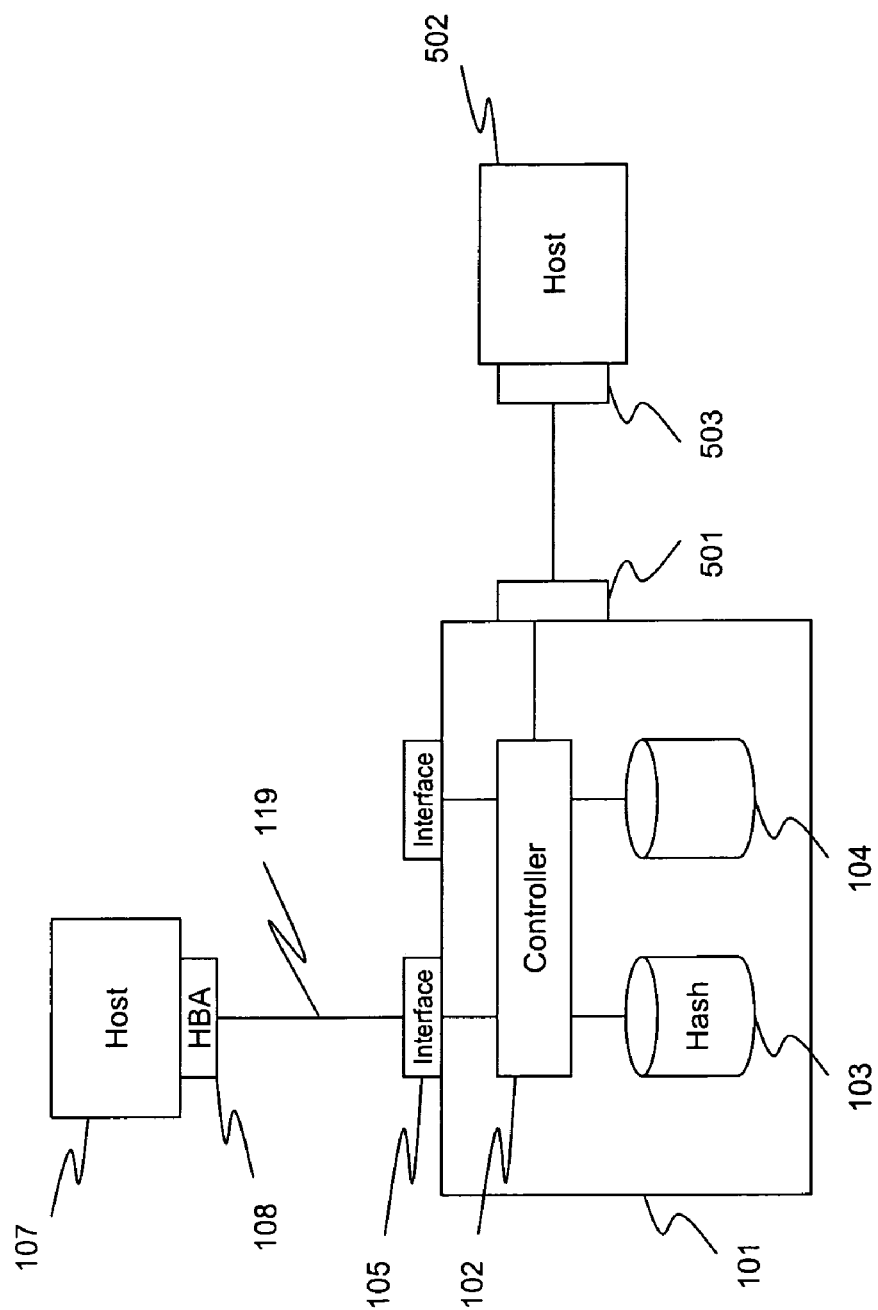
FIG. 1 is a block diagram of a storage system for implementing the data integrity technology of this invention.

FIG. 1 is a block diagram of a typical storage system within which the invention may be implemented. The storage system itself 101 typically includes a storage controller 102 and a series of volumes 103 and 104. For explanation, volume 103 is considered herein to be a logical or physical volume, referred to as a "hash volume," because it will be used to store a hash table, as well as other user data if desired, while volume 104 is another volume in the storage system 101. Storage system 101 is connected through an interface 105 to a bus 119, for example, a Fiber Channel. Bus 119 is connected through a host bus adaptor 108 to receive information from host 107 and provide information to that host. The storage system 101 may also be coupled through another interface 501 to another host 502 and its host bus adaptor 503.

In this application the preferred implementation is to use a hash volume as described above. Alternatively, however, the storage for the hash values can be provided in a separate volume, in a shared memory, or in the same volume as the data volume. This storage can be provided at any desired location, e.g. in the implementation discussed in FIG. 5, it may be provided in volumes 101 or 109.

When host 107 issues input/output operations to volume 104, those requests come into the storage system 101 via the interface 105, and then are forwarded to the actual volume via the controller 102. Reads from the volumes are made by the controller 102 and the resulting data passed back to the host 107. In a preferred embodiment, as will be discussed in more detail below, the controller also includes an access control capability to permit it to accept or decline input/output operations from a certain host, or to a certain volume. In other words, controller 102 can be configured to permit only reads from volume 104, or a portion thereof, and to prevent any writes to volume 104, or the portion thereof. This is achieved by checking the target address of any write against a table of "write-prohibited" addresses, as discussed below.

Storage controller 102 also includes the functionality of being able to compute a hash value of all, or a portion, of the data stored on volume 104. The resulting hash value is stored in hash volume 103. The hash values are essentially uniquely defined by the data upon which they operate, thereby making the probability of a collision very rare. Thus the hash values provide a technique for determining whether data has been altered between a specified time at which the hash value is calculated, and a later time when the hash value is calculated again. The hash value is preferably calculated using a "one-way" hashing operation which prevents "reverse engineering" the original data from the hash values. Computation and storage of these hash values is one feature of the invention which provides the data integrity.

FIG. 2 is a diagram illustrating a table for storing hash values. This table typically will be provided on volume 103, termed the hash volume. Algorithms for creating hash values are well known. Herein, the hash values are computed by mathematical operations performed on the data stored in the region of the hard disk drive desired to be proven to be unchanged at a later time. For example, the table in FIG. 2 shows the hash values calculated on the basis of data in specified address ranges in storage volume 104.

Each address range has been assigned a section number in FIG. 2. As depicted, the volume designated volume 1 in FIG. 2 has four sections, and volume 2 has three sections. For illustration, data ranges are provided for each of the sections and volumes, however, these are arbitrary. An advantage, however, of computing the hash value based on a range of addresses encompassing less than all of the volume, rather than the volume as a whole, is that computation of the hash values is more quickly calculated. Calculation of hash values for an entire volume can be prolonged. In addition, calculating hash values for subsets of the data enables them to be recalculated later if the data is changed. The hash value itself is calculated using the data found in the data range at the indicated location. For example, the hash value in the fourth row of FIG. 2 is the hash value for the data found in the data range of 4096–8191 on the volume with ID=1.

Any desired hashing technology may be employed to calculate the hash values, but the choice of the particular algorithm employed usually changes the length of the hash values. For example, the SHA-1 algorithm creates 160-bit hash values, while the MD-5 algorithm creates 128-bit hash values. The hash volume table may also include additional columns to indicate the particular hash algorithm employed, enabling different algorithms to be used for different data ranges.

The method of operation of the system of the invention is discussed next. When it is desired to preserve data, the storage system places the desired volumes, or portions thereof, into a "protected mode." This mode is initiated by a command from the host, from the storage controller, from an administrative computer, or from another source. The command is referred to as a "start protected mode" command herein. The command typically will include the ID of the target volume if the entire volume is to be placed in this protected mode. As explained above, however, the entire volume may be divided into sections, and the hash value calculated for each section. The process of dividing the volume into sections may be performed prior to receiving the start protective mode command, or after it. The manner in which the volume is divided may be determined automatically by the storage controller 102, or be specified in the command, or specified by separate dedicated commands which configure the sections prior to receipt of the start protective mode command. If only a portion of the data in the target volume is to be protected, then the start protective mode command may include the data range in its arguments.

Figure 3:
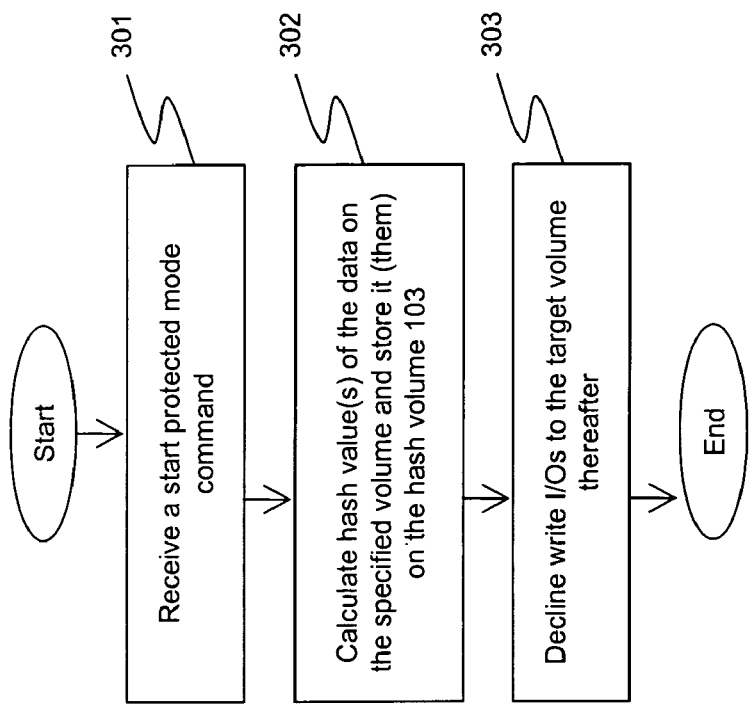
FIG. 3 is a flowchart of a method for providing data integrity.

FIG. 3 is a flowchart illustrating the protected mode operation. As shown there, the process begins with the storage controller 102 receiving a start protected mode command 301. Upon receipt of the command, the storage controller 102 calculates the hash value(s) of the data in the volume 104 for the specified ranges 207. From that time on, the storage controller 102 declines all write requests to those sections (or whatever regions have been designated), but continues to accept read requests. Thus, writes to the specified volume or sector will not occur.

Figure 4:
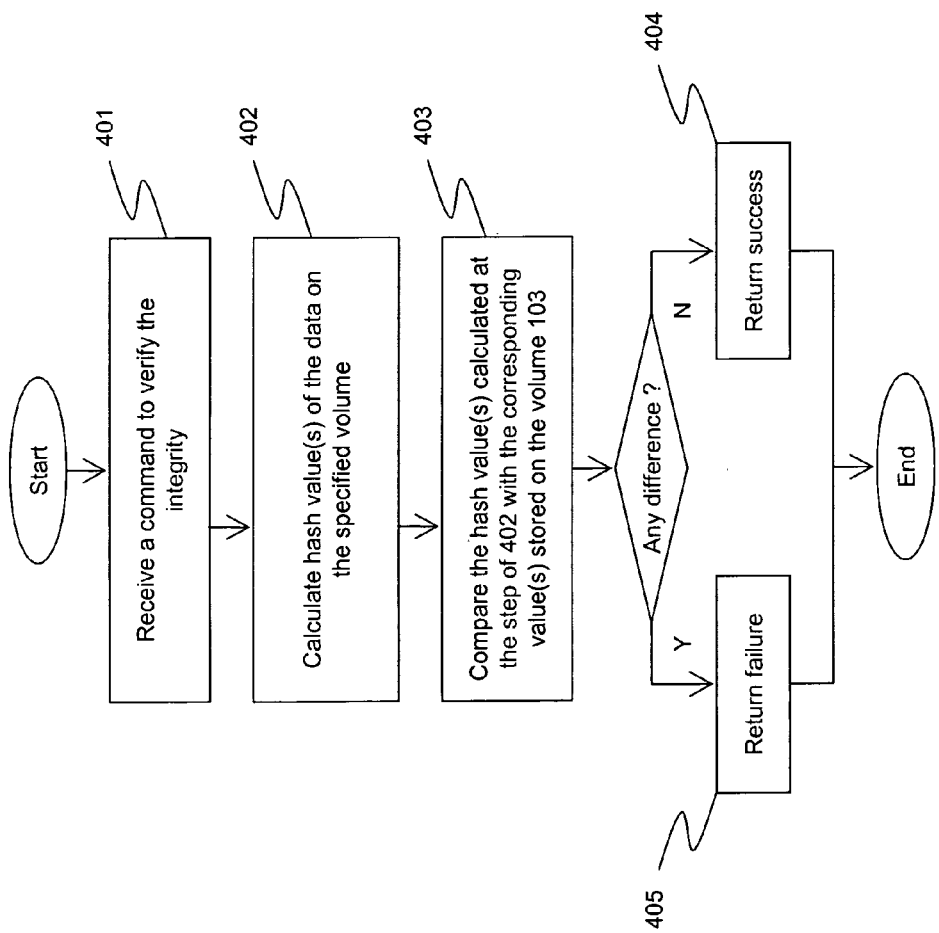
FIG. 4 is a flow chart illustrating a procedure for verifying integrity of the stored data.

FIG. 4 illustrates the process for verifying the integrity of the volume or region precluded from receiving writes. This operation will occur at any arbitrary time after the process of FIG. 3. When, as shown by step 401, the storage controller receives a command to verify the integrity of the data in the desired region, the system then calculates 402 the hash value of the data in the target area. Then, as shown by step 403, a comparison is made between the hash value calculated at step 402 and the corresponding value stored in the table for that region. Once the comparison is made, if there is a difference, failure is returned at step 405. If there is no difference, success is returned at step 404. The process then ends.

As explained above, the data input to the hash function may be all the data in the target volume, or preferably, a partial amount of that data. To create the partial data, the volume may be divided into equal parts of several sections, divided by sectors, or divided as some other arbitrary manner. If the volume is divided, however, the address range for each part should be specified, directly or implicitly, for example, as shown in column 203 of FIG. 2. The particular manner in which the volume is divided can be specified in the command which indicates to start a read-only mode, can be automatically calculated, or can be specified in separate commands for particular configurations.

If the volume is divided into sections on the basis of files stored, the address ranges to be protected usually will be given from the host 107, because host 107 maintains the tables of the addresses of the blocks where specific files are stored based on the file system for that storage. In this case, the write request to the target files may be declined at the file system level, not at the storage controller level.

If the storage system is functioning as a network attached storage server, the information to be given from the host 107 may not be the address range, but the file names, directory names, and partition names. This information enables the storage controller to generate information similar to table 201 from that information. Then, instead of declining rights to the particular region of data as shown by FIG. 3, the rights are declined to the specified files.

Figure 5:
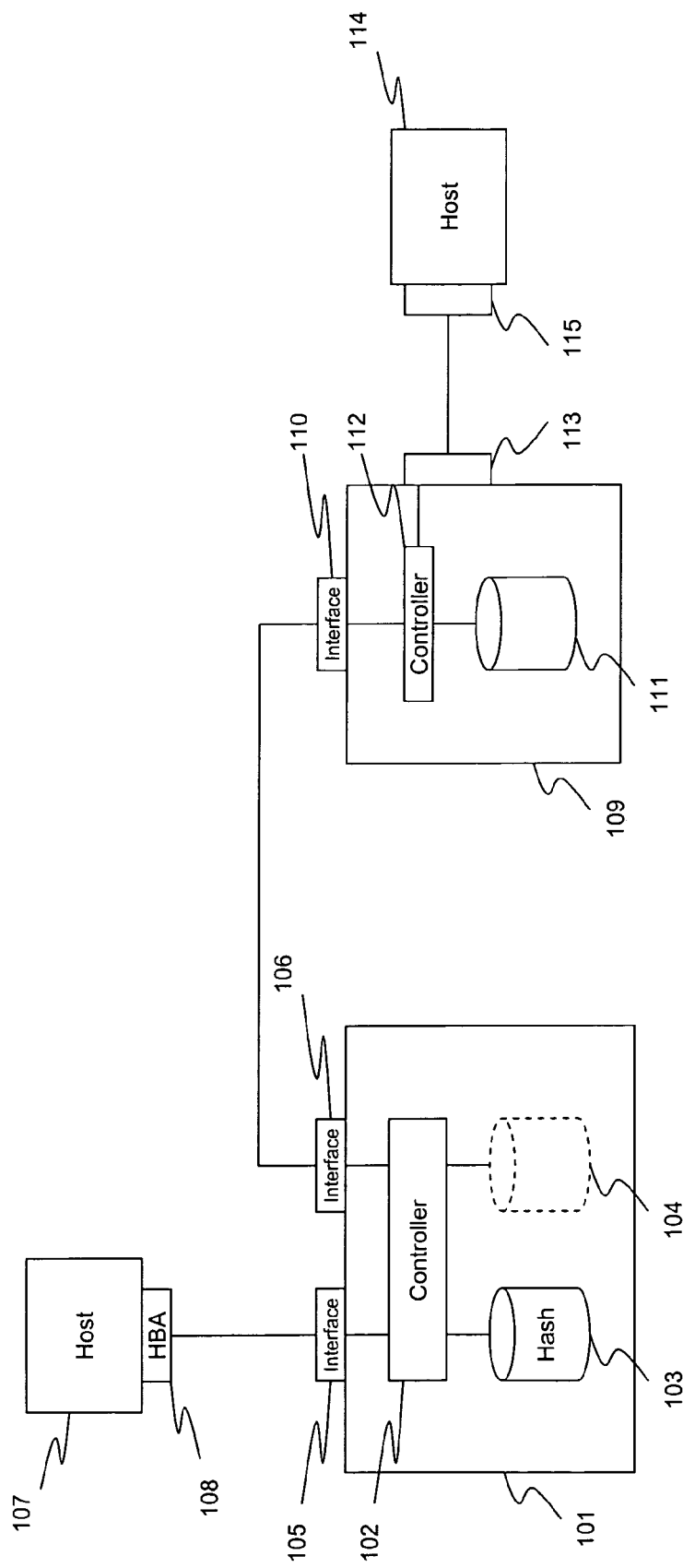
FIG. 5 is a block diagram of an alternative embodiment of the stored system.

FIG. 5 is a diagram of an alternative embodiment of a storage system which may also be used to implement the invention. The components shown in the left hand portion of FIG. 5 correspond to those in FIG. 1. In addition, however, there is a further storage system 109 with its own volumes 111 and storage controller 112. The storage system depicted in FIG. 5 has a virtualization capability which presents a virtual volume 104 in the storage system 101, but the actual volume resides in the storage system 109, typically an external storage system. In this operation, when the host 107 issues input/output instructions to the volume 104, they come into the storage system 101 via interface 105, but then are forwarded to the actual volume 111 via the interfaces 106 and 110. The result of the operations are returned to the host 107 in the opposite direction. In this implementation, storage controller 102 provides the access control capability of declining and accepting I/O operations to volume 111. It also provides the functionality of calculating the hash value on the specific volume or portion thereof, as well as storing that hash information in volume 103. Just as described above with respect to FIG. 1, the hash function may be all of the data on the target volume 111, or a part of it. The presence of host 114 in FIG. 5 is discussed next.

The techniques described herein are particularly advantageous because even if the storage system 109 does not have the functionality to decline write requests to specific data ranges, the invention provides a method for determining if the data has been changed. It may occur, for example, that storage system 109 is connected to a certain host 114 and accepts from that host unauthorized writes to the specified data area. FIG. 5 illustrates one such circumstance. The access to the volume 111 via interface 106 is limited only to the one which comes from interface 106 using security technologies such as LUN security or zoning. There is another path (113-115-114), however, that allows host 114 to have access to the volume 111. This may happen when a system administrator inadvertently forgets to configure the system to close the access via interface 113 or does not even know of the existence of such interface. While it may be difficult to prove there has never been such a security hole exposing the data, this invention provides a method of proving that the data has integrity, and has not been modified since the creation of the original hash value stored in the hash volume 103.

In another aspect of the invention a technique is provided for assuring that data cannot be altered after the defined start time of protection, but the hash values recalculated in an attempt to hide the alterations. The verification process specified in FIG. 4, used in conjunction with an encryption key, such as shown in FIG. 6, column 601, can overcome this circumstance. If the hash algorithm uses the cryptographic keys, and the keys have been securely stored, the assurance level of the data integrity can be raised. Of course, the level of encryption can be adjusted as necessary to assure that the hash value in the table has not been changed without alerting the system when it later checks for data integrity. One example of an algorithm employing such cryptographic keys is HMAC (RFC 2104).

The auditing function to verify data integrity is described next. Assume that a certain volume has been set in a protected mode at a specified time in the past by using the start protected mode command and the process described in FIG. 3. Also assume that it is now desired to check the volume to assure that the data has not been altered since the specified date. The command to verify the integrity of the volume is issued by a trusted individual, preferably in the presence of others, for example the auditor. The command is issued and the result displayed on a computer screen or printed on a form. A comparison of the hash values will verify the integrity of the stored data.

The foregoing has been a description of preferred embodiments of the invention. It will be appreciated, however, that various implementation details have been described to explain the invention. The scope of the invention, however, may be ascertained from the appended claims.

What is claimed is:

1. A storage system comprising:
a storage volume for storing data; and
a storage controller coupled to the storage volume, the controller controlling access to the storage volume, and being receptive to a command for preventing write operations to the data which has previously been stored in at least one selected portion of the storage volume prior to receiving the command; wherein
at a first time when the storage controller receives the command, a first hash value for the data is calculated, in response to receipt of the command; and
wherein at a second time later than the first time a second hash value for the data stored in at least the one selected portion of the storage volume is calculated and the second hash value is compared to the first hash value to determine if data stored in at least the selected portion of the storage volume has been changed between the first time and the second time.

2. A system as in claim 1 further comprising a hash value table for storing hash values for the stored data, the hash value table including information to identify the storage volume, the selected portion of the storage volume, and the hash value for data stored in that selected portion.

3. A system as in claim 2 wherein the hash values are calculated using secret keys before being stored in the hash value table, and the table further includes information about an encryption key.

4. A system as in claim 2 further comprising an additional storage volume for storing the hash value table.

5. A system as in claim 1 wherein the storage volume is divided into sections, each having a range of addresses, and the at least one selected portion of the storage volume comprises a plurality of sections.

6. A system as in claim 5 wherein upon receipt of the command, write operations to the sections are prevented, and the first hash value for each section is calculated.

7. A system as in claim 1 wherein the at least one selected portion is determined by a data range.

8. A system as in claim 1 wherein the at least one selected portion is determined by a file name.

9. A system as in claim 1 wherein write operations are not prevented to the data which has previously been stored in at least one selected portion of the storage volume prior to receiving the command for preventing write operations to the data.

10. A system as in claim 9 wherein at a second time later than the first time a second hash value for the data stored in at least the one selected portion of the storage volume is calculated and the second hash value is compared to the first hash value to determine if data stored in at least the selected portion of the storage volume has been changed between the first time and the second time.

* * * * *